(12) United States Patent
Falk

(10) Patent No.: US 6,464,627 B1
(45) Date of Patent: Oct. 15, 2002

(54) HEATER CONTROL FOR INFANT WARMER

(75) Inventor: Steven M. Falk, Baltimore, MD (US)

(73) Assignee: Datex-Ohmeda, Inc., Madison, WI (US)

(*) Notice: Subject to any disclaimer, the term of this patent is extended or adjusted under 35 U.S.C. 154(b) by 80 days.

(21) Appl. No.: 09/677,275

(22) Filed: Oct. 2, 2000

Related U.S. Application Data

(60) Provisional application No. 60/182,136, filed on Feb. 12, 2000.

(51) Int. Cl.[7] ................................................ A61G 11/00
(52) U.S. Cl. ....................................................... 600/22
(58) Field of Search ...................... 600/22, 21; 128/736

(56) References Cited

U.S. PATENT DOCUMENTS 5,162,038 A * 11/1992 Wilker ........................ 600/22
5,817,003 A * 10/1998 Moll et al. ................... 600/22

* cited by examiner

Primary Examiner—Kevin Shaver
Assistant Examiner—Brian Szmal
(74) Attorney, Agent, or Firm—Roger M. Rathbun

(57) ABSTRACT

A heater control system for use with a radiant heater of an infant warmer. The system utilizes a patient skin temperature and a set temperature inputted by a user and initially subtracts the patient temperature from the set point temperature to arrive at a differential signal identified as the Patient Temperature Gradient (PTG). That PTG is the used to directly control the power to the radiant heater by modifying the power to the heater depending upon the sign and the magnitude of the PTG. Thus, the method of the present invention is not a proportional control system but seeks and finds its own level of power that is not governed by any specific temperature difference and will adjust the heater power where the resulting heater power adjustment may be different for a variety of conditions.

8 Claims, 2 Drawing Sheets

HEATER CONTROL FOR INFANT WARMER

This application claims the benefit of provisional application No. 60/182,136 filed on Feb. 12, 2000.

BACKGROUND

The present invention relates to an infant care warmer adapted to provide heat for the warming of an infant and, more particularly, to a method of controlling the intensity of a heater used in an infant warmer.

In the treatment of infants, and particularly those born prematurely, it is necessary to provide heat to the infant during the treatment of such infants and to minimize the heat loss of the infant. Accordingly, a common apparatus for providing such heat is an infant warmer. In general, the infant warmer comprises a flat, planar surface on which the infant rests while some procedure is being carried out on the infant. There are normally protective guards that surround the infant to keep the infant contained within the apparatus and there is an overhead heater that directs radiant energy in the infrared spectrum toward the infant to impinge upon that infant to provide warmth.

An infant warmer is shown and described in U.S. Pat. No. 5,474,517 of Falk and is an example of the type of infant care apparatus that is used to provide warmth to an infant while carrying our some procedure on that infant The are, of course, numerous methods and systems to control that heater, and currently, many of such warmers include an infant temperature sensor that is affixed to the skin of the infant and thus provides an input to the heater controller indicative of that infant skin temperature. In addition, there is also an input to the heater controller that can be set by the user depending on the desired temperature that the user wants to establish for the infant.

Given those inputs, the heater controller acts to counter the change in environmental temperature, and changes in the infant temperature to control the heater output to maintain the infant as closely as possible to that desired temperature set by the user.

One system used to control a radiant heater is shown and described in U.S. Pat. No. 5,162,038 of Wilker. In that patent, the control system uses a difference between the patient and the set point temperature to operate a proportional control loop and uses a proportional control technique to adjust the power to the heater. Thus, with proportional control, the power signal to the heater is based upon the difference in temperature and the same difference in temperature will result in the same adjustment to power to the heater. Accordingly, the control system of Wilker produces a predictable power for controlling the heater and respond directly and predictively to any change in temperature.

SUMMARY OF THE INVENTION

Accordingly, the present invention relates to a method and system for controlling the radiant heater used in connection with an infant warmer. The present heater control system is carried out principally in software and provides a control of the radiant heater that is both fast responding and which causes the infant temperature to accurately trace the set temperature established by the user.

In present method and system, the system basically free runs and does not provide a predictable power change to the heater for any specific temperature difference between the patient and set temperature. Thus, the present system and method is not a proportional control but seeks and finds its own level of power that is not governed by any specific temperature difference. In effect, the system and method of the present invention will adjust the heater power and the resulting heater power adjustment may be different for a variety of conditions.

In carrying out the present invention, use is still made of the patient skin temperature and which is sensed by means such as a thermistor to convert that temperature into an analog signal. In addition, use is also made of a signal that is representative of the desired or set temperature inputted by the user. Initially, the present method take the signals representative of the patient skin temperature and the set temperature and performs a subtraction function to subtract the patient temperature from the set point temperature to arrive at a differential signal identified as the Patient Temperature Gradient (PTG).

The present control system thus uses that PTG to directly control the power to the heater by means of a controller that basically supplies the power to the heater and that controller thus directly modifies the power to the heater depending upon the sign and the magnitude of the PTG. The heater has, of course, a known full power rating and the settings are based upon that power. In actual operation, the magnitude and sign of the PTG is sampled at predetermined time intervals, generally every 30 seconds. As each sample is provided to the controller, power to the heater is controlled as will be explained.

The heater is initially started as a reduced power, preferably at about 50% power on power up and the predetermined timed samples of PTG affect the power to the heater as follows:

Less than −0.3 C., the heater is off
−0.3 to −0.15 C.; subtract 5% from the last heater power
−0.15 to 0.05 C.; use last heater power
0.05 to 0.15 C.; add 1% to the last heater power
0.15 to 0.25 C.; Add 5% to the last heater power
0.25 to 0.35 C.; add 10% to the last heater power
0.35–0.50 C.; add 15% to the last heater power
If PTG is greater than 0.5 C., the heater is on full power.

As can be seen, there may be an initial step of determining whether the PTG is within certain predetermined limits described above and, if the PTG is less than the −0.3 PTG, the system may proceed directly to the controller to set the power to the heater at 0 percent. Likewise, at that initial determination, if the PTG is greater than 0.5 C., the power to the heater can be directly set by the controller to 100% power to that heater.

Thus, as can be seen, by directly utilizing the PTG, the controller can make an immediate adjustment to the heater power in order to track the desired set point inputted by the user. In each instance, the percentage of power referenced is based on a percent of full power to the heater, thus each incremental changes made by the controller to the heater is a fixed value.

Additional features and advantages of the invention will become apparent to those skilled in the art upon consideration of the following detailed description of preferred embodiments exemplifying the best mode of carrying out the invention.

DETAILED DESCRIPTION OF THE INVENTION

Figure 1:
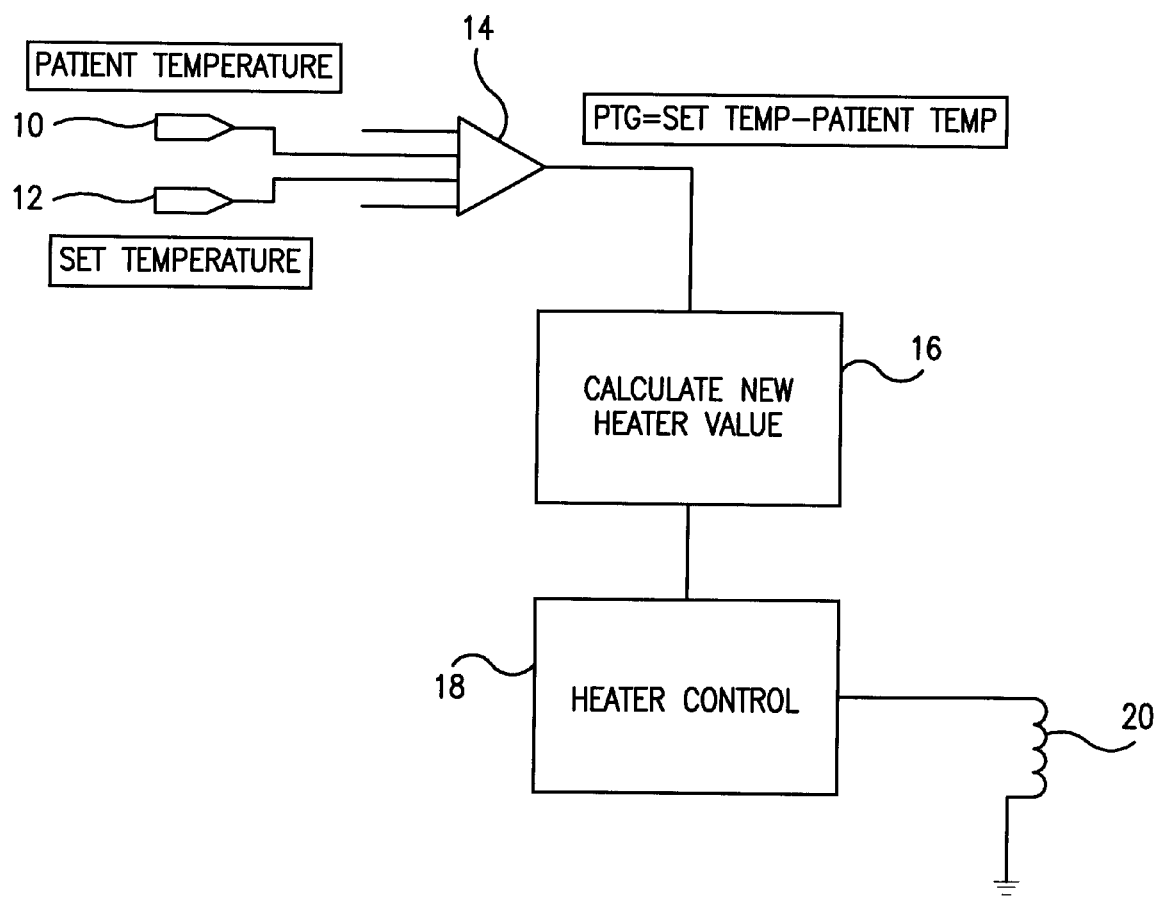
FIG. 1 is a block diagram of the control means for controlling the operation of a radiant heater for an infant warmer.

Turning now to FIG. 1, there is shown a block diagram of the components of a infant warmer constructed in accordance with the present invention. As can be seen, there is a patient temperature sensor 10 that is affixed, in conventional manner, to the skin of an infant and such device may be a thermistor or other device that senses the temperature of the infant and produces an electrical signal, in analog form, representative of the temperature of the infant.

There is also an input device 12 to enable the user to input the desired temperature for the infant and will hereinafter be referred to as the "set temperature". That device may be any electronic input device that allow the user to set the desired temperature of the infant and which produces an analog signal representative of that temperature. Thus, the signal representative of the set temperature and the signal representative of the patient temperature is sent to an element to carry out a subtraction function, such as a differential amplifier 14 where the signals are subtracted, deriving a signal representative of the patient temperature subtracted from the set temperature. The resultant differential signal will be referred to as the Patient Temperature Gradient (PTG).

That PTG signal is then supplied to a controller 16 where an algorithm is employed to ultimately result in a signal that acts upon a heater control 18 and, ultimately, the heater 20. The heater control 18 is basically a variable power supply to the heater and which can be varied in its output power supplied directly to the heater depending upon the signal from the controller 16 as will be explained.

Figure 2:
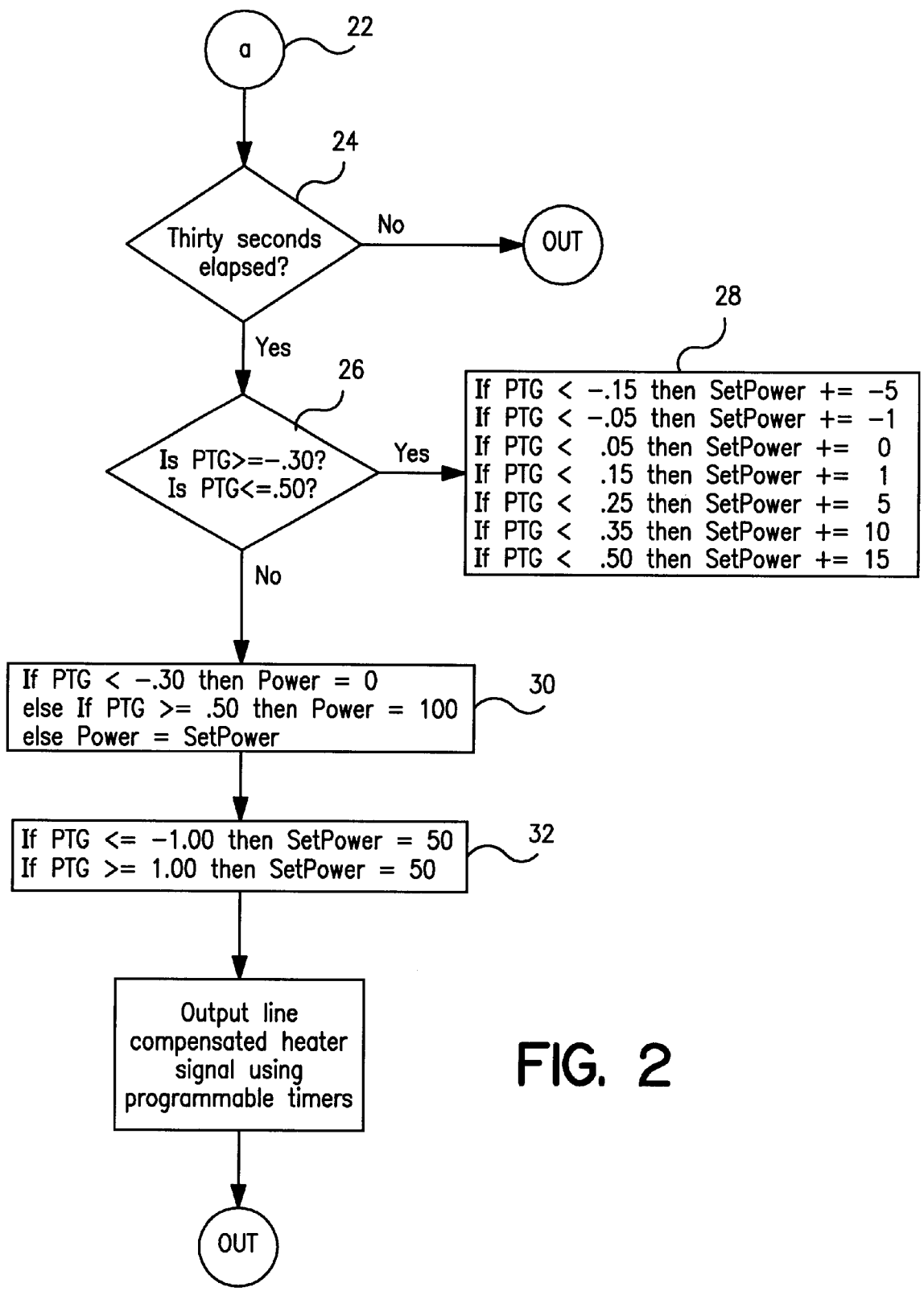
FIG. 2 is a data flow diagram to carry exemplifying the operation of the controller used with the present invention.

Turning now to FIG. 2, there is shown a data flow diagram of the controller that provides the signal to the heater control 18 for varying the energy form the heater control 16 to the heater 20.

Thus, the PTG is schematically illustrated at 22 in FIG. 2 and such signal enters decision step 24 where a determination is made whether a predetermined amount of time has elapsed since the last time a signal was provided to the heater control 18. In the preferred embodiment, the timing is 30 seconds and thus, the present invention preferably updates the power to the heater every thirty seconds, and changes that power when necessary as will be explained.

As can be seen, by the decision step 24, if the predetermined time has not elapsed, no action is taken, however, if that predetermined time has elapsed, the signal representative of the PTG is passed to decision step 26. At decision step 26, the PTG is checked to determine its magnitude as well as its sign. If the PTG is the PTG is equal to or greater than −0.30 degrees or the PTG is equal to or less than 0.50 degrees, that is, the difference in the set point temperature and the patient temperature is within the range of −0.30 and +0.50 degrees, then the method of the present invention proceeds to step 28 where an appropriate signal is provided to be outputted to the heater control 18 to adjust the power to the heater 20 as will be explained.

As can be seen in the step 28, a different power setting is provided depending on the PTG and its sign, for example if the PTG is less than −0.15, the heater set power is reduced 5%; if the PTG is less than 0.05, the set power is increased by 1%. As can be seen, therefore, the power is directly controlled by the step 28 depending on the PTG and there are no intermediate steps in the control of the power to the heater or additional signals that need to be added or subtracted from the PTG in order to arrive at the desired heater power.

Following are the power incremental changes commanded at step 28 depending on the PTG:

−0.3 to −0.15 C.; subtract 5% from the last heater power
−0.15 to 0.05 C.; use last heater power
0.05 to 0.15 C.; add 1% to the last heater power
0.15 to 0.25 C.; Add 5% to the last heater power
0.25 to 0.35 C.; add 10% to the last heater power
0.35–0.50 C.; add 15% to the last heater power In each instance, the percentages shown are based on the percentage of full power, thus the incremental changes are known, positive increments and not based upon percent of any intermediate power setting.

Again, returning to decision step 26, if the PTG is outside of the predetermined range, that is the PTG is less than −0.30 or more than 0.50, i.e. the answer to the decision step 26 is no, then the process continues to step 30 where the power is controlled based upon whether the PTG is to high with respect to the predetermined range or too low. If the PTG is too high, that is, it is greater than 0.50 degrees, it is an indication that the infant is too cold with respect to the set temperature inputted by the user and the heater is immediately powered at 100% power. If, on the other hand, the PTG is less than −0.30, indicating that the infant is warmer than the set temperature by that amount, then, at step 30, the power to the heater would be set at 0% i.e. the power turned off to the heater.

Otherwise, as seen in step 30, if the PTG is within the predetermined range such that the set power has been determined by step 28, then the power to the heater is established at the set temperature. Thus, the power to the heater is determined at step 30 to be 100% power, 0% power or a power that equals the set power established in step 28.

Finally, the signal is passed to step 32 where the over all PTG is evaluated and the initial set power is adjusted if the PTF is outside certain limits.

In block 34, the actual power to the heater is controlled and that control is carried out by means of conventional timers and circuitry.

Those skilled in the art will readily recognize numerous adaptations and modifications which can be made to the heater control system of the present invention which will result in an improved system yet all of which will fall within the scope and spirit of the present invention as defined in the following claims. Accordingly, the invention is to be limited only by the following claims and their equivalents.

I claim:

1. A method of controlling the energy to a radiant heater for supplying heat to an infant contained in an infant apparatus, said method comprising the steps of:
   a. measuring the skin temperature of an infant in the infant apparatus,
   b. inputting a set temperature desired for the infant,
   c. generating an error signal indicative of the difference between the input set temperature and the skin temperature of an infant to obtain a patient temperature gradient (PTG),
   d. providing a source of a first pouncer level to the radiant heater, and
   e. making an incremental adjustment to the first power level to the radiant heater to provide a second power level to the radiant heater by adding or subtracting to the first power level an incremental level of power that is determined by the magnitude and sign of the PTG.

2. A method of controlling the energy to a radiant heater as defined in claim 1 wherein said step of measuring the skin temperature of an infant comprises using an electronic component to provide a signal representative of the skin temperature and said step of inputting a set temperature comprises inputting a signal representative of the set temperature.

3. A method of controlling the energy to a radiant heater as defined in claim 2 wherein said step of generating a error signal comprises using a differential amplifier to subtract the analog signals obtained in steps a and b.

4. A method of controlling the energy to a radiant heater as defined in claim 1 wherein said method is carried out repetitively at a predetermined time interval.

5. A method of controlling the energy to a radiant heater as defined in claim 4 wherein said time interval is about 30 seconds.

6. A method of controlling the energy to a radiant heater as defined in claim 4 wherein said step of making an incremental adjustment to the first power level comprises adding or subtracting an incremental level that is a predetermined percentage of full power to the heater at each time interval.

7. A method of controlling the energy to a radiant heater as defined in claim 6 wherein said step of making an incremental adjustment to the first power level comprises establishing a series of ranges of values for the PTG and making the incremental adjustment of power a predetermined percentage depending upon the magnitude and sign of the PTG being within one of the series of ranges.

8. A method of controlling the energy to a radiant heater as defined in claim 7 wherein the incremental adjustment to the power is based on the PTG being within the following series of ranges:

−0.3 to −0.15 C.; subtract 5% from the last heater power

−0.15 to 0.05 C.; use last heater power

.05 to 0.15 C.; add 1% to the last heater power 0.15 to 0.25 C.; Add 5% to the last heater power 0.25 to 0.35 C.; add 10% to the last heater power 0.35–0.50 C.; add 15% to the last heater power.

* * * * *